W. J. SMITH.
SPLICE BAR.
APPLICATION FILED SEPT. 29, 1913.
1,107,123.
Patented Aug. 11, 1914.
2 SHEETS—SHEET 1.
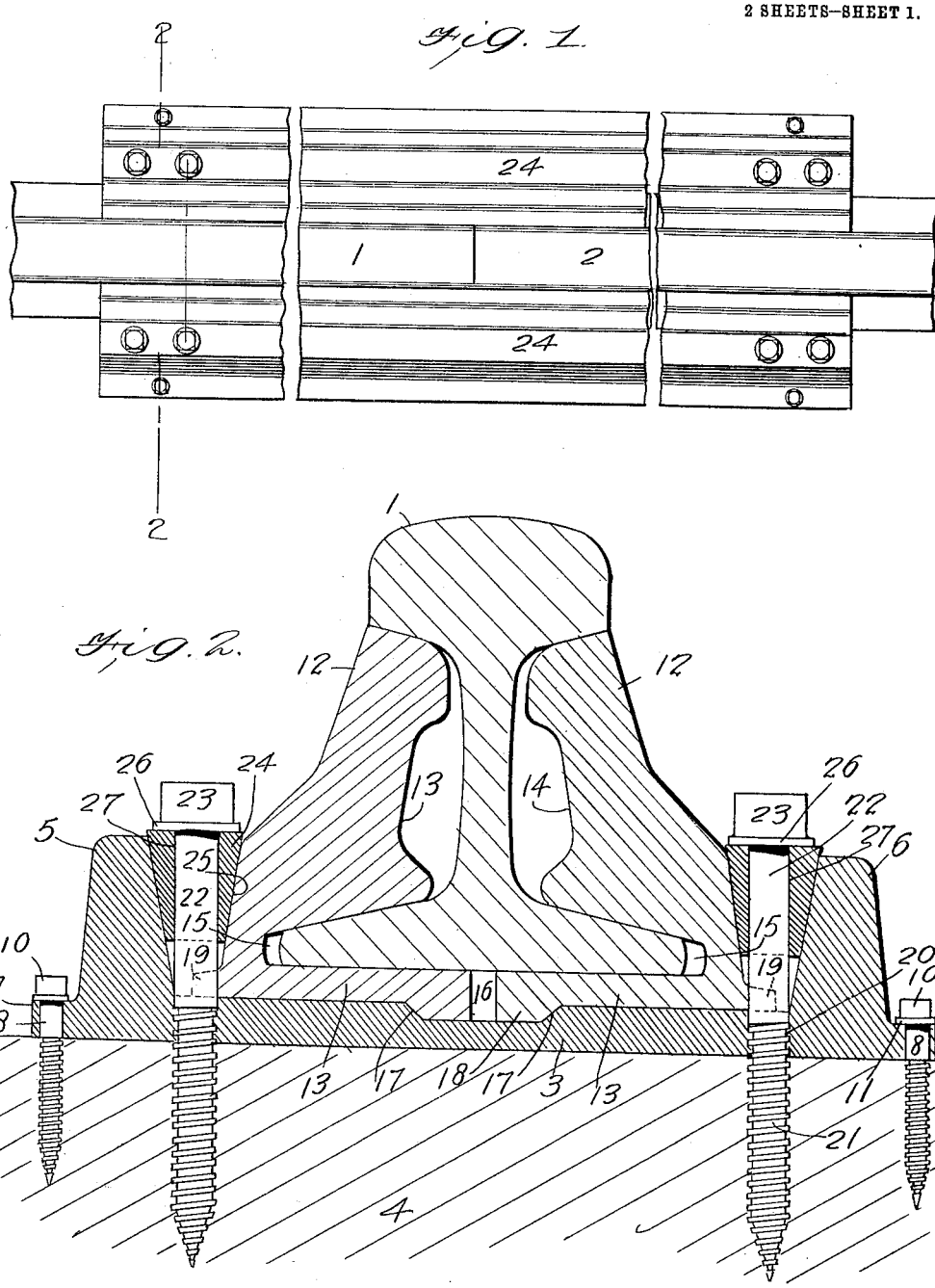
WITNESSES
H. C. Barry
C. E. Trainor
INVENTOR
Walter J. Smith
BY
Munn & Co.
ATTORNEYS W. J. SMITH.
SPLICE BAR.
APPLICATION FILED SEPT. 29, 1913.
1,107,123.
Patented Aug. 11, 1914.
2 SHEETS—SHEET 2.
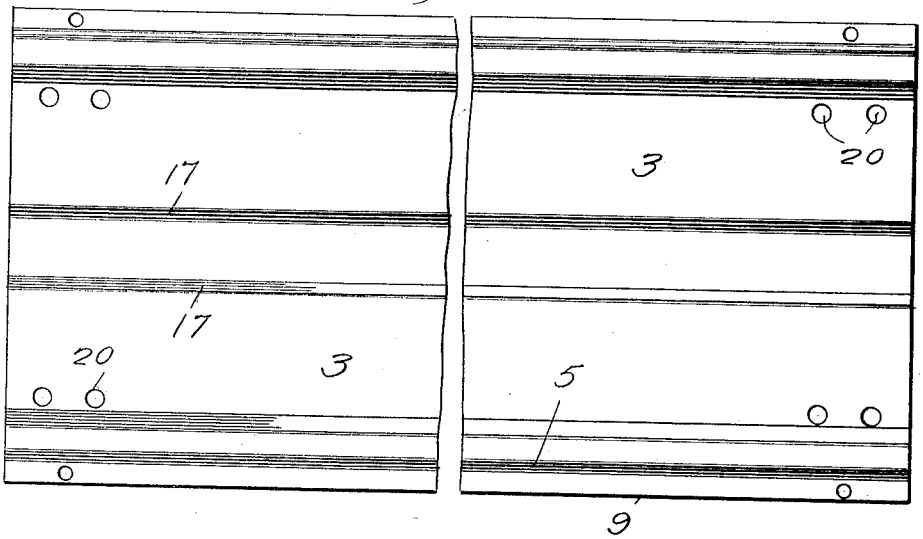
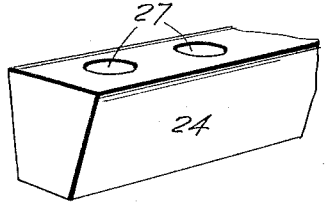
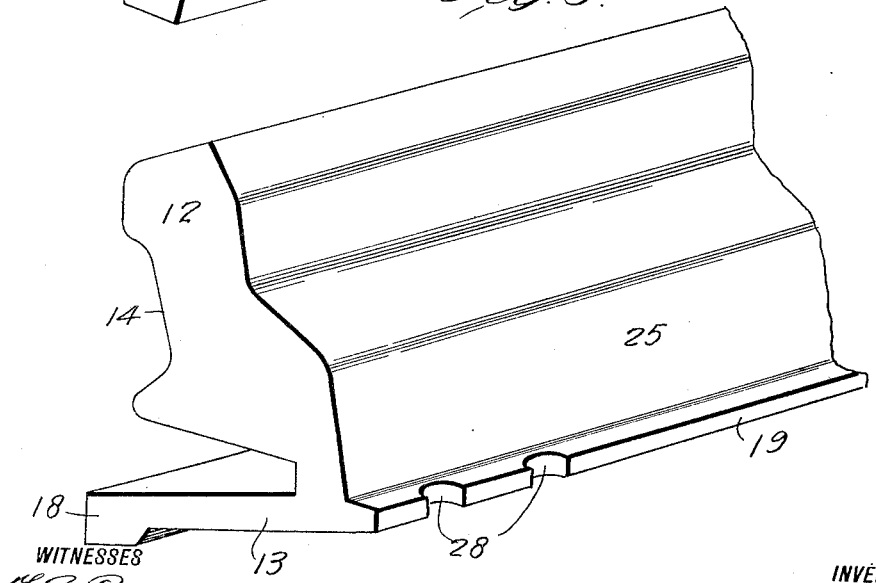
WITNESSES
F. C. Barry
C. E. Trainor
INVENTOR
Walter J. Smith
BY
ATTORNEYS

UNITED STATES PATENT OFFICE.

WALTER J. SMITH, OF BESSEMER, ALABAMA.

SPLICE-BAR.

1,107,123.  Specification of Letters Patent.  Patented Aug. 11, 1914.

Application filed September 29, 1913. Serial No. 792,341.

*To all whom it may concern:*

Be it known that I, WALTER J. SMITH, a citizen of the United States, and a resident of Bessemer, in the county of Jefferson and State of Alabama, have made certain new and useful Improvements in Splice-Bars, of which the following is a specification.

My invention is an improvement in splice bars, for connecting rail ends, and has for its object to provide an attachment of the character specified, for securely joining the meeting ends of rails, without the use of bolts or the like passing transversely of the rail, and wherein mechanism is provided for securely anchoring the rail ends in alinement, to the tie, without requiring any transverse opening in the rail or the connecting means.

In the drawings: Figure 1 is a top plan view of the improvement in use, Fig. 2 is a section on the line 2—2 of Fig. 1, Fig. 3 is a top plan view of the rail seat, Fig. 4 is a partial perspective view of one of the wedges, and Fig. 5 is a similar view of a portion of one of the fish plates.

The present embodiment of the invention is shown in connection with meeting rail ends 1 and 2 respectively, and the attachment consists of a saddle or rail seat comprising a body 3 adapted to be seated upon the tie 4 beneath the rail end, and the said body is provided with upstanding flanges 5 and 6 at each side of the rail, the said flanges extending above the rail base. The saddle or rail seat is also provided with lateral flanges 7, and each of the said flanges is provided with openings for receiving screw bolts. Each of the said bolts comprises a threaded body 8 for engaging the tie, a plane portion 9 within the opening of the flange 7, and a head 10 above the said flange. A washer 11 may be arranged between the head and the flange, and the head is polygonal in cross section, to permit the screw bolt to be turned by a tool.

Fish plates are arranged on each side of the meeting rail ends, each fish plate consisting of a portion 12 lying alongside the web of the rail, and a portion 13 seated beneath the base of the rail. The portion 12 of each of the fish plates is longitudinally grooved on its inner face, as shown at 14, for reducing the weight, and for the sake of resiliency, and each of the said portions at its upper edge abuts against the adjacent under face of the head.

The portion 13 of each fish plate lies beneath the base flanges of the rails, and at the junction of the portions 12 and 13 each fish plate is provided with a longitudinally extending groove or recess 15 for receiving the adjacent side edge of the base flange of the rail. The grooves or recesses 15 are of greater depth than the width of the side edge of the base flange, so that a space is left between the bottom of each groove or recess and the adjacent edge of the rail base, as shown in Fig. 2.

The rail seat 3 is provided at its longitudinal center on its upper face, with a groove 16 extending longitudinally of the said seat, and the side walls of the groove are inclined or beveled, as shown at 17. Each of the portions 13 of the fish plate is provided at its inner edge, and on its under face, with a rib 18, the said rib extending longitudinally of the said inner edge, and each of the said ribs has an inclined outer side wall, as shown, fitting against the adjacent wall of the groove 16.

The adjacent edges of the portions 13 of the fish plates do not abut, as shown in Fig. 2, but the said edges are spaced apart a distance corresponding approximately to the width of the space left between the bottoms of the grooves 15 and the edges of the base flange of the rail. The rib 18 provides a locking means for preventing lateral movement of the fish plates. Each fish plate is provided at its outer edge, and at the junction between the portions 12 and 13 with a longitudinally extending rib 19.

The rail seat is provided with openings 20 at the inner wall of the flanges 5, and near each end of the seat, for receiving screw bolts, each of the said bolts comprising a threaded portion 21 for engaging the tie, a plane portion 22, for a purpose to be presently described, and a head 23. The plane portion 22 of each screw bolt is received between the fish plate and the adjacent flange face, and a wedge 24 is also arranged in the said space.

It will be noted from an inspection of Fig. 2, that the inner wall of each flange 5 and 6 inclines downwardly and inwardly, and that the adjacent portion of the fish plate is also inclined downwardly and outwardly, as shown at 25. The wedges 24 fit between these inclined walls, and the plane portions 22 of the screw bolts pass through the plain openings 27 in the wedges. The ribs 19 of the fish plates are recessed, as shown at 28, for receiving the screw bolts, and by means of the said bolts the wedges may be drawn downwardly, to force the rail seats toward the rail.

A washer 26 is arranged between the head of each bolt and the wedge, and the heads are polygonal, to permit the engagement of a wrench or the like, for turning the screw bolts. The ribs 18 by their engagement with the groove 16 provide a perfect lock for preventing lateral movement of the fish plate, since the principal weight is directly above the said ribs. The rail ends are held firmly against movement in any direction except longitudinally, and they may move longitudinally to compensate for expansion and contraction.

In use, the seat is first placed on the ties, and secured by the screw bolts passing through the ribs 7. The seat is placed beneath one rail end, and the fish plates may be inserted, after which the outer rail end may be inserted between the fish plates. The wedges 24 are then placed, after which the screw bolts 22 are tightened to force the wedges down, and to move the fish plates toward the rail ends. It will be noticed that the wedges 24 have two openings at each end, for receiving the screw bolts.

I claim:—

1. In combination with the meeting ends of the rails, of a seat for the said ends, said seat having longitudinally extending ribs near its side edges, said ribs being beveled on their inner faces, said seat having a longitudinally extending groove provided with inclined side walls between the ribs, and having means whereby it may be secured to the ties, fish plates each consisting of a portion engaging beneath the rail base and resting on the upper face of the seat and having a rib on its under face at its inner edge fitting the groove of the seat, and a portion fitting against the web of the rail, said portions being integral, and each fish plate having a longitudinally extending groove or recess at the junction of the portions for receiving the adjacent side edge of the rail base, and of greater width than the width of the said edge, each fish plate having at its outer face an inclined surface arranged opposite the inclined face of the adjacent rib, wedges extending longitudinally of the rails between the ribs of the seat and the inclined surfaces of the fish plates, said wedges and the seat having registering openings, and screw bolts passing through the said openings and engaging the ties, each fish plate having an outwardly extending rib below the inclined surface, each rib being notched to receive a screw bolt.

2. In combination with the meeting ends of the rails, of a seat for the said ends, said seat having longitudinally extending ribs near its side edges, each rib being inclined on its inner face, fish plates each having a longitudinally extending groove for receiving the adjacent side edge of the base flange of the rail and of greater depth than the said side edge, each fish plate having an inclined face adjacent to the inner face of the adjacent rib of the seat, and inclining in the opposite direction, wedges arranged between the said faces of the fish plates and the ribs, and means for pressing the wedges downwardly, said means comprising screw bolts, the wedges and the seat having registering openings for receiving the bolts, said bolts engaging the ties, each fish plate having a rib extending laterally at the lower side of the inclined surfaces and extending toward the adjacent rib of the seat, each rib being notched to permit the passage of the screw bolts, said seat and fish plates having interlocking means for preventing lateral movement of the fish plates with respect to the seat, said means comprising a groove on the upper face of the seat at approximately the center thereof, and ribs on the fish plates engaging the groove.

3. In combination with the meeting ends of the rails, of a seat for the said ends, said seat having longitudinally extending ribs near its side edges, each rib being inclined on its inner face, fish plates each having a longitudinally extending groove for receiving the adjacent side edge of the base flange of the rail and of greater depth than the said side edge, each fish plate having an inclined face adjacent to the face of the adjacent rib of the seat, and inclining in the opposite direction, wedges arranged between the said faces of the fish plates and the ribs, and means for pressing the wedges downwardly, said means comprising screw bolts, the wedges and the seat having registering openings for receiving the bolts, said bolts engaging the ties, each fish plate having a rib extending laterally at the lower side of the inclined surface and extending toward the adjacent rib of the seat, each rib being notched to permit the passage of the screw bolts, said seat and fish plates having interlocking means for preventing lateral movement of the fish plates with respect to the seat.

4. In combination with the meeting ends of the rails, of a seat for the said ends, said seat having longitudinally extending ribs near its side edges, each rib being inclined on its inner face, fish plates each having a longitudinally extending groove for receiving the adjacent side edge of the base flange of the rail and of greater depth than the said side edge, each fish plate having an inclined face adjacent to the face of the adjacent rib of the seat, and inclining in the opposite direction, wedges arranged between the said faces of the fish plates and the ribs, and means for pressing the wedges downwardly, said means comprising screw bolts, the wedges and the seat having registering openings for receiving the bolts, said bolts engaging the ties, each fish plate having a rib extending laterally at the lower side of the inclined surface and extending toward the adjacent rib of the seat, each rib being notched to permit the passage of the screw bolts.

5. In combination with the meeting ends of the rails, of a seat for the said ends, said seat having longitudinally extending ribs near its side edges, each rib being inclined on its inner face, fish plates each having a longitudinally extending groove for receiving the adjacent side edge of the base flange of the rail and of greater depth than the said side edge, each fish plate having an inclined face adjacent to the inner face of the adjacent rib of the seat, and inclining in the opposite direction, wedges arranged between the said faces of the fish plates and the ribs, and means for pressing the wedges downwardly.

6. The combination with the meeting ends of the rails, of a seat adapted to be arranged between the rails and the ties and having means for permitting the seat to be secured to the ties, of fish plates for engaging opposite faces of the rail, said plates being grooved or recessed longitudinally to receive the side edges of the rail base, each of the said plates fitting the adjacent side of the rail from the under face of the tread to approximately the center of the under face of the rail base, said seat and plates having interlocking means beneath the rail for preventing lateral movement of the plates with respect to the seat, and means in connection with the seat and the fish plates for forcing the said plates toward the rail, said means comprising ribs on the seat extending longitudinally of the rails at opposite sides thereof, each fish plate and the adjacent rail having their adjacent surfaces beveled in opposite directions, wedges received between each adjacent pair of faces, and means for forcing the wedges downwardly.

7. The combination with the meeting ends of the rails, of a seat adapted to be arranged between the rails and the ties and having means for permitting the seat to be secured to the ties, of fish plates for engaging opposite faces of the rail, said plates being grooved or recessed longitudinally to receive the side edges of the rail base, each of the said plates fitting the adjacent side of the rail from the under face of the tread to approximately the center of the under face of the rail base, said seat and plates having interlocking means beneath the rail for preventing lateral movement between the plates with respect to the seat, and means in connection with the seat and the fish plates for forcing the said plates toward the rail.

8. Means for connecting the meeting ends of rails, comprising a seat adapted to be arranged between the rails and the ties, fish plates for engaging opposite faces of the rails, each of the said plates comprising a portion engaging the web of the rail, and a portion fitting beneath the base flange of the rail, the seat having a longitudinal groove on its upper face at approximately the center thereof and each fish plate having on the portion beneath the base flange a rib fitting within the groove at the adjacent side thereof, and means in connection with the seat and the fish plates for forcing the said plates toward the rail.

WALTER J. SMITH.

Witnesses:
OSCAR WARDEN TUCKER,
SILAS MORGAN LANNY.